United States Patent
Rohlfs et al.

(10) Patent No.: US 12,214,786 B2
(45) Date of Patent: Feb. 4, 2025

(54) METHOD FOR LATERALLY CONTROLLING A MOTOR VEHICLE ON A ROAD HAVING TWO LANES AND MOTOR VEHICLE

(71) Applicant: Volkswagen Aktiengesellschaft, Wolfsburg (DE)

(72) Inventors: Michael Rohlfs, Rötgesbüttel (DE); Daniel Münning, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 236 days.

(21) Appl. No.: 17/956,436

(22) Filed: Sep. 29, 2022

(65) Prior Publication Data

US 2023/0103020 A1 Mar. 30, 2023

(30) Foreign Application Priority Data

Sep. 29, 2021 (DE) .......................... 102021210924.1

(51) Int. Cl.
*B60W 30/12* (2020.01)
*G06V 10/75* (2022.01)
*G06V 20/56* (2022.01)

(52) U.S. Cl.
CPC ........... *B60W 30/12* (2013.01); *G06V 10/751* (2022.01); *G06V 20/588* (2022.01);
(Continued)

(58) Field of Classification Search
CPC ........... B60W 30/12; B60W 2420/403; B60W 2520/10; B60W 2552/05; B60W 2552/10;
(Continued)

(56) References Cited

U.S. PATENT DOCUMENTS 10,955,855 B1 3/2021 Tran
10,962,982 B2 3/2021 Fridman
(Continued)

FOREIGN PATENT DOCUMENTS

CN 110516652 A 11/2019
DE 102005039103 A1 3/2007
(Continued)

OTHER PUBLICATIONS

Appln. No. DE102021210924.1. Examination Report (May 27, 2022).
(Continued)

*Primary Examiner* — Aaron L Troost
(74) *Attorney, Agent, or Firm* — Peter Zura; LOZA & LOZA, LLP

(57) ABSTRACT

Technologies and techniques for laterally controlling a motor vehicle on a road, where a roadway marking assigned to a driver's side of the motor vehicle is assigned to a lane type based on sensor data. The lane type characterizes whether the roadway marking is assigned to an ego lane on which the motor vehicle is to be guided, or whether it is assigned to a neighboring lane adjacent to the ego lane. The roadway marking is also assigned to the lane type, based on swarm data, and the lane type assigned to the roadway marking is established as the lane type that is determined as a function of the swarm data when the sensor lane type and the swarm data lane type diverge. The motor vehicle is laterally controlled as a function of the established lane type of the roadway marking assigned to the driver's side of the motor vehicle.

20 Claims, 2 Drawing Sheets

(52) U.S. Cl.
CPC ... *B60W 2420/403* (2013.01); *B60W 2520/10* (2013.01); *B60W 2552/05* (2020.02); *B60W 2552/10* (2020.02); *B60W 2552/30* (2020.02); *B60W 2552/53* (2020.02)

(58) Field of Classification Search
CPC ......... B60W 2552/30; B60W 2552/53; B60W 2554/408; G06V 10/751; G06V 20/588
See application file for complete search history.

(56) References Cited

U.S. PATENT DOCUMENTS

| | | | |
|---|---|---|---|
| 2017/0016740 A1* | 1/2017 | Cui | G01C 21/30 |
| 2017/0025018 A1* | 1/2017 | Gignac | G08G 1/167 |
| 2017/0139417 A1* | 5/2017 | Reiff | G06V 20/588 |
| 2018/0053060 A1* | 2/2018 | Huang | G08G 1/167 |
| 2018/0203453 A1* | 7/2018 | Hardy | G08G 1/096725 |
| 2019/0107836 A1* | 4/2019 | Walker | G06V 20/56 |
| 2019/0344787 A1* | 11/2019 | Pietzsch | G06T 7/73 |
| 2020/0201344 A1* | 6/2020 | Viswanathan | G05D 1/0088 |
| 2020/0319297 A1 | 10/2020 | Bruns et al. | |
| 2021/0262825 A1* | 8/2021 | Miyagawa | G01C 21/3819 |
| 2021/0279483 A1* | 9/2021 | Wittkampf | G06V 20/588 |
| 2022/0205810 A1* | 6/2022 | Wada | G01C 21/3815 |

FOREIGN PATENT DOCUMENTS

| | | |
|---|---|---|
| DE | 102016220647 A1 | 4/2018 |
| DE | 102018114808 A1 | 12/2019 |
| DE | 102019202589 A1 | 8/2020 |
| DE | 102019213185 A1 | 3/2021 |
| DE | 102020202163 A1 | 8/2021 |
| WO | 2005039957 A1 | 5/2005 |
| WO | 2015106913 A1 | 7/2015 |
| WO | 2021043507 A1 | 3/2021 |

OTHER PUBLICATIONS

Sarkar et al. "Fast Swarm Based Lane Detection System for Mobile Robot Navigation on Urban Roads." American Society of Mechanical Engineers. Dynamic Systems and Control Conference. Paper No. DSCC2009-2702, pp. 387-393; (Sep. 16, 2010).

* cited by examiner

METHOD FOR LATERALLY CONTROLLING A MOTOR VEHICLE ON A ROAD HAVING TWO LANES AND MOTOR VEHICLE

RELATED APPLICATIONS

The present application claims priority to German Patent App. No. 10 2021 210 924.1, to Rohlfs, et al., filed on Sep. 29, 2021, the contents of which is incorporated by reference in its entirety herein.

TECHNICAL FIELD

The present disclosure relates to technologies and techniques for laterally controlling a motor vehicle on a road having at least two lanes and to a motor vehicle.

BACKGROUND

WO 2021/043507 A1 discloses a method for laterally controlling a vehicle, in which environment data of the vehicle is detected while traveling on the road. Furthermore, stored environment data is received, which was detected, when traveling on the road, by a plurality of other vehicles not currently traveling the route. This stored environment data is subjected to a plausibility check based on the detected environment data. A lateral control of the method is carried out based on the environment data that has been checked for plausibility. Using the environment data, at least one left roadway marking or roadway boundary, from the view of the vehicle, or a right roadway marking or roadway boundary, from the view of the vehicle, or at least one outer roadway edge is detected as an environment property.

Furthermore, U.S. Pat. No. 10,955,855 B1 discloses a method for autonomous navigation, in which travel segments from an origin to a destination are generated. In the process, a freeway entrance, an exit lane or a freeway separator structure is detected based on a road marking, using a camera and a sensor. Based on data outputs of the camera and the sensor, a 3D model is generated in real time. This real-time 3D model is confirmed at a current position by way of a high-definition map database. If the travel segment passes the freeway entrance or exit based on the confirmed real-time 3D model, a current lane is being followed, without exiting. Otherwise, the car follows the freeway entrance or exit.

SUMMARY

Aspects of the present disclosure are directed to creating a solution that makes it possible to safely laterally control a motor vehicle when swarm data and sensor data of the motor vehicle diverge.

Some of these aspects are disclosed by the subject matter of the independent claims. Further aspects of the present disclosure are disclosed the dependent claims, the description, and the figures.

The present disclosure relates to technologies and techniques for laterally controlling a motor vehicle on a road. The present disclosure is in particular advantageous in the case of a two-lane road, when a center line of the road is absent or the center line of the road is concealed, for example by soiling or by snow, and thus can no longer be recognized by a detection device of the motor vehicle. For example, if there is oncoming traffic on this road having the at least two lanes, it is important that the motor vehicle is reliably guided on its lane to avoid a collision between the motor vehicle and the oncoming traffic.

In the method, it is provided that a roadway marking assigned to a driver's side of the motor vehicle is assigned to a lane type based on sensor data representing an environment of the motor vehicle, wherein the lane type characterizes whether the roadway marking is assigned to an ego lane on which the motor vehicle is to be guided, or a neighboring lane adjacent to the ego lane. This means that the roadway marking assigned to the driver's side of the motor vehicle which is situated to the left of the motor vehicle in the case of right-hand traffic, or to the right of the motor vehicle in the case of left-hand traffic, is detected via a sensor device in the form of sensor data representing the roadway marking. Based on this sensor data, it is determined, using an electronic computing device, whether the determined roadway marking delimits the ego lane or the neighboring lane and is thus assigned to the ego lane or the neighboring lane. In the method, it is furthermore provided that the roadway marking assigned to the driver's side of the motor vehicle is assigned to the lane type based on swarm data received from further vehicles. In this way, it is determined based on the swarm data whether the roadway marking assigned to the driver's side is to be assigned to the ego lane or the neighboring lane. The swarm data describes environment data that was recorded by further vehicles in the past and provided for the motor vehicle. For this purpose, this swarm data can, for example, be provided via a server device for the motor vehicle.

The present disclosure furthermore relates to a motor vehicle, which is designed to be operated within the scope of the above-described method according to the present disclosure or a refinement of this method according to the present disclosure. Advantages and advantageous refinements of the method according to the present disclosure shall be regarded as advantages and advantageous refinements of the motor vehicle according to the present disclosure, and vice versa.

Further features of the present disclosure can be derived from the following description of the figures and based on drawings. The features and feature combinations mentioned above in the description, and the features and feature combinations shown hereafter in the description of the figures and/or shown only in the figures, can be used not only in the respectively indicated combination, but also in other combinations, or alone, without departing from the scope of the present disclosure.

DETAILED DESCRIPTION

Figure 1:
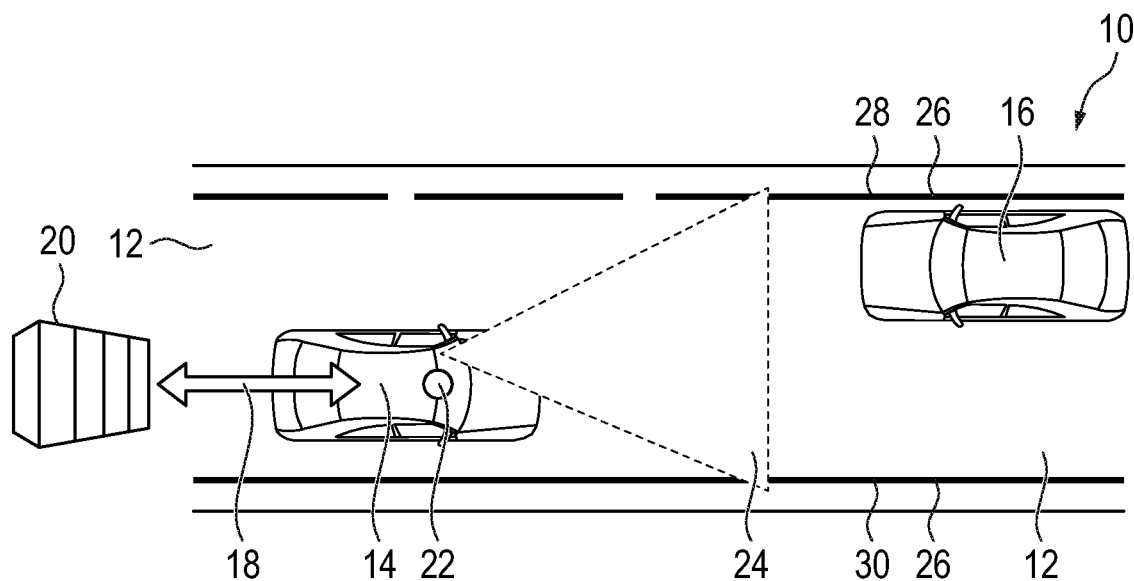
FIG. 1 shows a schematic top view of a road having two lanes, on which a motor vehicle is driving on an ego lane, and another road user is driving on a neighboring lane, the motor vehicle comprising a sensor device which includes a camera device and by means of which sensor data representing an environment of the motor vehicle can be recorded, and the motor vehicle receiving swarm data from a higher-level server device, whereby the motor vehicle can be laterally controlled on the road in an assisted manner, under some aspects of the present disclosure.

Like or functionally equivalent elements are denoted by like reference numerals in the figures.

In some examples described herein, the lane type assigned to the roadway marking is established as the lane type determined as a function of the swarm data when the lane type for the roadway marking assigned to the driver's side which is determined based on the sensor data and the lane type determined based on the swarm data diverge. Utilizing the electronic computing device, it is possible to carry out a comparison between the lane type of this roadway marking which is determined by way of the swarm data and the lane type of this roadway marking which is determined by way of the sensor data. If it is determined within the scope of the comparison that the lane type determined based on the sensor data and the lane type of this roadway marking determined based on the swarm data are not identical (i.e., they diverge), it is specified that the lane type of the roadway marking is the lane type that is determined as a function of the swarm data. The lane type of the roadway marking which is determined as a function of the sensor data is thus overridden. In this case, it is thus assumed that an error is present in the sensor data, which causes the lane type of the roadway marking which is determined as a function of the sensor data to deviate from the lane type of the roadway marking which is determined as a function of the swarm data. This makes it possible for the motor vehicle to be safely controlled laterally even in the event of an error of the sensor data.

In some examples, the motor vehicle may be laterally controlled via a control unit in an assisted manner, as a function of the established lane type of the roadway marking assigned to the driver's side of the motor vehicle. Depending on whether the roadway marking is determined to delimit the ego lane or to delimit the neighboring traffic lane as a result of the lane type determined as a function of the swarm data, the motor vehicle is laterally guided accordingly so as to keep a risk of a collision between the motor vehicle and oncoming traffic driving on the neighboring lane particularly low. In this way, the motor vehicle can be operated particularly safely. The motor vehicle can be laterally controlled as a function of at least one predefined condition based on the established lane type of the roadway marking assigned to the driver's side of the motor vehicle.

For example, a distance between the motor vehicle and a roadway marking assigned to a passenger side of the motor vehicle can only be adjusted in accordance with the established lane type when, serving as the predefined condition, the lane type for the roadway marking assigned to the driver's side which is determined based on the sensor data and the lane type which is determined based on the swarm data diverge at least for a predefined covered route and/or a predefined lapsed duration. In this way, it is possible to avoid changing the distance between the motor vehicle and the roadway marking assigned to the passenger side of the motor vehicle, which is often undesirable. To ensure that the motor vehicle is guided centrally on the road, the roadway marking assigned to the driver's side of the motor vehicle and the roadway marking assigned to the passenger side of the motor vehicle are each to be determined to be ego markings. The motor vehicle is laterally guided from one side of the road to the center when the predefined route has been covered by the motor vehicle and/or the predefined duration has lapsed. A main source for the lateral control of the motor vehicle is a form of the roadway marking assigned to the passenger side of the motor vehicle which is recognized in real time.

In some examples, the motor vehicle may be laterally controlled based on the sensor data. The sensor data can be provided by a camera device of the sensor device and/or a radar device of the sensor device and/or a LIDAR device of the sensor device and/or an ultrasonic device of the sensor device. The lateral control of the motor vehicle based on the sensor data makes it possible to control the motor vehicle particularly safely based on current data representing the detected environment of the motor vehicle. In this way, the motor vehicle can be guided particularly safely across the road, along the road, in particular when circumstances change on short notice.

In some examples, the motor vehicle may be laterally controlled based on swarm data. This means that both the lane type is determined based on the swarm data, and the lateral control of the motor vehicle is controlled by means of the swarm data, in that the swarm data is used, instead of the sensor data, for laterally controlling the motor vehicle. In particular when an error is present in the sensor data, it is particularly safe to laterally control the motor vehicle based on the swarm data, in particular since the swarm data is verified via multiple vehicles.

In some examples, the lane type assigned to the roadway marking is established as the lane type that is determined as a function of the sensor data when a lane type determined based on the sensor data and a lane type determined based on the swarm data for the roadway marking assigned to the passenger side of the motor vehicle diverge. In other words, the lane type assigned to the roadway marking is established as the lane type that is determined as a function of the sensor data when the respective lane types determined based on the sensor data and the lane types determined based on the swarm data for the particular roadway marking diverge, both for the roadway marking assigned to the driver's side and the roadway marking assigned to the passenger side, and are therefore not identical. If it is thus determined that both the roadway marking assigned to the driver's side and the roadway marking assigned to the passenger side are each assigned to different lane types by way of the swarm data and by way of the sensor data, it is determined that, most likely, an error is present in the swarm data since the sensor data is generally considered to be more reliable than the swarm data.

For example, a change of a lane trajectory of the road that occurred in the past may exist, which is already reflected in the sensor data, but not yet reflected in the swarm data. If the lane types determined for the roadway marking assigned to the driver's side diverge with respect to the sensor data and the swarm data, while the lane types determined for the roadway marking assigned to the passenger are identical for the sensor data and the swarm data, the lane type assigned to the roadway marking is established as the lane type determined as a function of the swarm data. In this way, the lane type of the roadway marking that is assigned to the driver's side can be accurately determined with particularly high likelihood, whereby a risk of the motor vehicle colliding with oncoming traffic or with another vehicle can be kept particularly low.

In some examples, the sensor data may include camera data, based on which the roadway marking assigned to the driver's side of the motor vehicle is analyzed by way of an image recognition process. Furthermore, the roadway marking assigned to the passenger side of the motor vehicle can be analyzed by way of the image recognition method based on the camera data. The camera data may include respective images depicting an environment of the motor vehicle, such as the roadway marking, which can be analyzed within the scope of the image recognition method for a presence of a roadway marking or for a determination of a kind and thus of the lane type of the roadway marking. The camera data allows the environment of the motor vehicle to be recorded particularly extensively, whereby a particularly well-informed decision can be made about a lane type of the particular roadway marking, in particular of the roadway marking assigned to the driver's side of the motor vehicle, by way of the image recognition method, in particular by means of the electronic computing device.

In some examples, the lane type assigned to the roadway marking may be established as the lane type, determined as a function of the swarm data when the swarm data meets at least one predefined quality criterion. If the swarm data does not meet a predefined quality criterion, the lane type assigned to the roadway marking is established as the lane type that is determined as a function of the sensor data. The at least one quality criterion describes how reliable the swarm data is with respect to the determination of the lane type of the roadway marking. The swarm data is thus only used for establishing the lane type of the roadway marking assigned to the driver's side when this swarm data has proven to be sufficiently safe, accurate and reliable based on the at least one predefined quality criterion.

In some examples, a match rate of parameters determined from the swarm data in relation to parameters determined from the sensor data for a defined route section may be specified as the quality criterion, and/or that a localization quality of a localization of the motor vehicle on the road based on the swarm data is specified as a quality criterion. This means that the sensor data is compared to the swarm data for a defined specified route section, and the quality criterion is regarded as being met when the swarm data, within a predefined tolerance range, supplies a result identical to that of the sensor data for at least one predefined parameter. This parameter can, for example, be a distance between the motor vehicle and a predefined roadway marking and/or an angle error of the motor vehicle. For example, a route section recently traveled by the motor vehicle, over a length of approximately 100 meters, can be considered to be the defined route section. In this way, a historical analysis of the swarm data compared to the sensor data is carried out. If the localization quality of the localization of the motor vehicle on the roadway, based on the swarm data is specified as the quality criterion, it is then checked whether a localization quality for the motor vehicle based on the swarm data is sufficiently high.

The localization quality describes the accuracy with which the localization of the motor vehicle by way of the swarm data, in particular in a digital map, takes place. It is possible to consider a localization of the motor vehicle along a driving direction. For example, it can be analyzed whether the motor vehicle can be localized based on the swarm data with meter precision and/or with centimeter precision and/or with millimeter precision. This localization quality of the swarm data can be checked, for example, based on respective curves of the road, and in particular a relative position of the motor vehicle on the road with respect to a curve can be determined by way of the sensor data, and it can be checked whether a relative position of the motor vehicle on the road with respect to the curve, as determined based on the swarm data, matches, in particular within a predefined tolerance range. If this determined localization quality of the localization of the motor vehicle based on the swarm data is greater than a predefined minimum localization quality, it is determined that this quality criterion is met. The respective predefined quality criteria make it possible to use the swarm data only for the ascertainment of the lane type of the respective roadway markings when these have a sufficient quality.

In some examples, the lane type assigned to the roadway marking may be established as the lane type determined as a function of the swarm data, while a predefined time interval is ongoing and/or while the motor vehicle is covering a predefined route and/or while the motor vehicle is being moved in the driving direction at a speed within a predefined speed range and/or when the road has a curvature above a predefined curvature limit value and/or when a road including the roadway marking has a width within a predefined width range and/or when the motor vehicle has a distance with respect to a further roadway marking assigned to a passenger side of the motor vehicle within a predefined distance range. This means that the lane type assigned to the roadway marking is established as the lane type that is determined as a function of the sensor data when the time interval has lapsed and/or the motor vehicle is situated outside the predefined route and/or the motor vehicle is moving in the driving direction or counter to the driving direction at a speed outside the predefined speed range and/or when the curvature of the road is below or equal to the predefined curvature limit value and/or when the road including the roadway marking has a width outside the predefined width range and/or when the motor vehicle has a distance with respect to a further roadway marking assigned to the passenger side of the motor vehicle outside the predefined distance range.

In this way, respective boundary conditions for the sensor data being overruled by the swarm data can be specified during the determination of the lane type. If these boundary conditions are not met, overruling of the lane type determined based on the sensor data for the roadway marking that is assigned to the driver's side of the motor vehicle by the lane type determined based on the swarm type can be dispensed with. Accordingly, clear boundaries can be specified as to when the lane type determined as a function of the swarm data is permitted to overrule the lane type determined as a function of the sensor data. Outside these boundaries, the lane type of the roadway marking assigned to the driver's side is generally specified by the sensor data since it is assumed that the sensor data is particularly accurate given the up-to-date nature thereof. Thus, a risk of the lane type of the roadway marking assigned to the driver's side which is determined based on the sensor data being erroneously overruled by the lane type determined based on the swarm data can be kept particularly low.

In some examples, the lane type assigned to the roadway marking that is assigned to the driver's side of the motor vehicle is established as the lane type that is determined as a function of the sensor data, when the lane type determined based on the sensor data and the lane type determined based on the swarm data are identical. If the same lane type is determined for the roadway marking that is assigned to the driver's side of the motor vehicle, both based on the swarm data and based on the sensor data, it is assumed that no error of the sensor data is present, and the sensor data can thus be used for determining the lane type. Regardless of whether the same lane type is determined for a roadway marking that is assigned to the passenger side of the motor vehicle by way of the sensor data and by way of the swarm data, it is thus established, when the identical lane type is determined for the roadway marking that is assigned to the driver's side, that overruling of the sensor data is not to take place for the ascertainment of the lane type.

Since it is assumed in this example that the sensor data is particularly reliable for the determination of the lane type of the roadway marking that is assigned to the passenger side, it is in particular provided in this method that the sensor data is only overruled by the swarm data with respect to the assessment of the lane type of the roadway marking that is assigned to the driver's side when the swarm data and the sensor data diverge in terms of the assessment of the lane type for the roadway marking that is assigned to the driver's side of the motor vehicle, not however for the assessment of the lane type for the roadway marking assigned to the passenger side. A risk of an incorrect assessment of the lane type of the roadway marking that is assigned to the driver's side of the motor vehicle can thus be kept particularly low. As a result, a risk of the motor vehicle colliding with further road users on the road can be kept particularly low.

The example of FIG. 1 shows a road 10 in an overhead view, wherein the road 10 has two lanes 12. A center line for separating the lanes 12 from one another is absent in the present example. Accordingly, it can be difficult for road users driving on the road 10 to distinguish the number of lanes 12 that the road 10 has. Here, one motor vehicle 14 and one further road user 16 are driving on the road 10. The motor vehicle 14 is moving on an ego lane, while the further road user 16 is moving as oncoming traffic on a lane adjacent to the ego lane.

The motor vehicle 14 is designed to receive swarm data 18 from a higher-level server device 20. This swarm data 18 describes driving data of further vehicles, which were driven along the road 10, and in particular on the ego lane, at an earlier point in time In addition, the motor vehicle 14 comprises a camera device 22 as part of a sensor device, which is designed to record camera data representing an environment of the motor vehicle 14, serving as sensor data 32. For this purpose, a visual range 24 of the camera device 22 is directed into an environment of the motor vehicle 14, and in particular at an environment of the motor vehicle 14 situated in the driving direction ahead of the motor vehicle 14. In this way, the camera device 22 can detect roadway markings 26 delimiting the road 10 toward the outside. A first of the roadway markings 26, which is denoted hereafter by reference numeral 28, delimits the road 10 toward a side that is assigned to a driver's side of the motor vehicle 14. The second roadway marking 30 delimits the road 10 toward a side of the motor vehicle 14 that is assigned to a passenger side of the motor vehicle 14.

So as to avoid a collision between the motor vehicle 14 and the further road user 16 during an at least assisted lateral control of the motor vehicle 14, it is important that the motor vehicle 14 is able to distinguish whether the road 10 only has a single lane 12, and the motor vehicle 14 can thus be guided centrally on the road 10, or whether the road 10 has multiple lanes 12, and the motor vehicle 14 must therefore be safely kept on the ego lane to prevent a collision of the motor vehicle 14 with the further road user 16 driving on the neighboring lane. For this determination, the motor vehicle 14 comprises an electronic computing device, by means of which it is possible to determine, based on the sensor data 32 and/or the swarm data 18, whether the first roadway marking 28 is assigned to the neighboring lane or the ego lane. If it is determined that the first roadway marking 28 is assigned to the ego lane, the motor vehicle 14 can be safely guided centrally on the road 10 since the road 10 has only one lane 12. If it is determined by means of the electronic computing device that the first roadway marking 28 is assigned to the neighboring lane, the motor vehicle 14 must be safely kept on the ego lane during the assisted lateral control so as to avoid a collision between the motor vehicle 14 and the further road 16 situated on the neighboring lane, since the road 10 has at least the ego lane and the neighboring lane.

In addition to lanes that are recognized in real time, future driver assistance systems can also use swarm data 18. This swarm data 18 can encompass a lot of up-to-the-minute information and be stored in a cloud. Furthermore, this swarm data 18 can be based on the data detected by current production vehicles in particular by means of a front camera and is cumulatively stored on the backend. In this way, a very large number of vehicles recognize certain traffic lane boundaries, and upload these recognized lanes to the cloud. There, the data is analyzed and made available for vehicles using the data, in the present example the motor vehicle 14. In addition to this swarm data 18, the motor vehicle 14 using the data can primarily utilize real-life lanes recognized by the camera device 22, which are represented by the sensor data 32. On this basis, a lateral control of the motor vehicle 14 can be offered. During a real-life detection of the camera device 22, it is in particular possible, based on neural networks, to determine whether recognized traffic lane boundaries are assigned to the ego lane or the neighboring lane. In particular, a driver assistance system without swarm data 18 may require two roadway markings 26 assigned to the ego lane, on the basis of which the motor vehicle 14 can be kept in the center of this lane 12. If the first roadway marking 28 assigned to the driver's side of the motor vehicle 14 is recognized as a neighboring marking assigned to the neighboring lane, a lateral control of the motor vehicle 14 can be abandoned, taking hystereses into consideration. This means that, with respect to the customer, an incorrectly recognized or incorrectly assigned roadway marking 26 can directly impact a driving behavior of the motor vehicle 14. With the aid of the swarm data 18, this behavior can be considerably improved.

The motor vehicle 14 comprises the sensor device, which can encompass the camera device 22 and/or a radar and/or ultrasonic sensors, wherein the motor vehicle 14 can additionally receive the swarm data 18. The motor vehicle 14 is furthermore designed to be laterally controlled in an assisted manner by a control unit of the motor vehicle 14.

An incorrect lane assignment of a neighboring lane marking is problematic. Furthermore, an incorrect or changing, incomprehensible driving behavior of the system could occur on narrow rural roads, depending on how well the real-life lane detection is working at that particular moment. In the prior art, lanes 12 that are recognized in real time are not overruled with the aid of the swarm data 18. This means that a real-life lane detection by way of sensor data 32, based on which the motor vehicle 14 is being controlled, is given a higher priority in the algorithm than the swarm data 18. To solve these described problems, information of the real-life recognition by the camera device 22 is to be overruled by the swarm data 18 in certain situations. In this way, an erroneously recognized lane recognition of the camera device 22 can be stabilized with the aid of the swarm data 18.

If the neighboring lane is recognized as a neighboring lane, the motor vehicle 14 is controlled correctly, wherein the motor vehicle 14, based on the sensor data 32 and/or the swarm data 18, can be kept on the ego lane and, for example, can be guided approximately 15 centimeters away from the second roadway marking 30 that is assigned to the passenger side of the motor vehicle 14. If the neighboring lane is erroneously identified as the ego lane, incorrect behavior of the motor vehicle 14 can occur in that the motor vehicle 14 is driving in the center of the road 10 in the middle of the lane.

Figure 2:
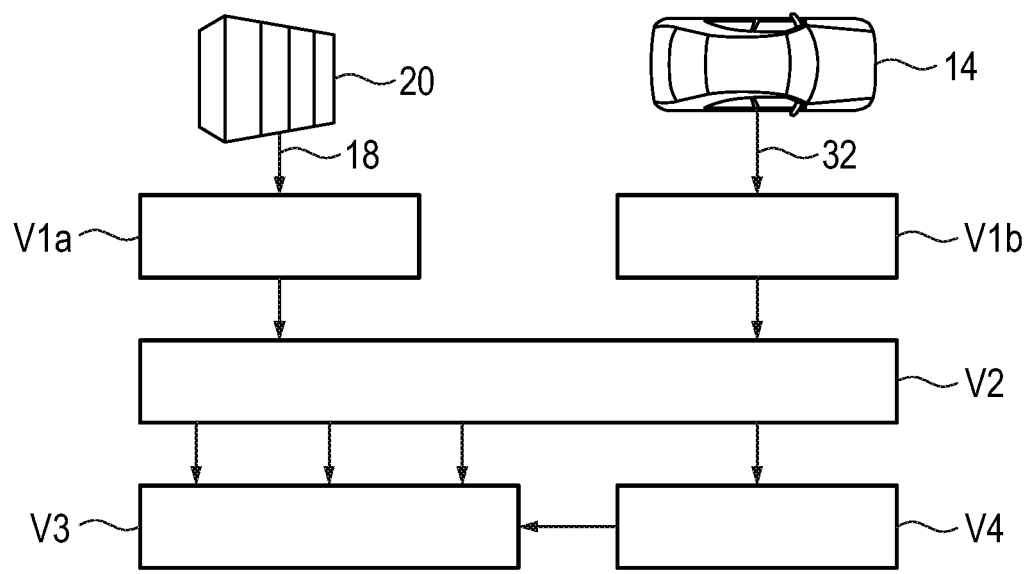
FIG. 2 shows a schematic diagram for a method for laterally controlling the motor vehicle, a lane type of a roadway marking that is assigned to a driver's side of the motor vehicle being determined both based on the sensor data and based on the swarm data, and the motor vehicle being laterally controlled as a function of the respective determined lane types, under some aspects of the present disclosure.

FIG. 2 shows a schematic diagram for a method for laterally controlling the motor vehicle 14. In a first method step V1a, the first roadway marking 28 assigned to the driver's side of the motor vehicle 14 is assigned to a lane type based on the received swarm data 18. In the first method step V1a, it is furthermore provided that the second roadway marking 30 assigned to the passenger side of the motor vehicle 14 is assigned to a lane type based on the swarm data 18. The lane type characterizes whether the respective roadway marking 26 is assigned to the ego lane on which the motor vehicle 14 is to be guided, or whether it is assigned to the neighboring lane adjacent to the ego lane.

In another first method step V1b of the method, it is provided that both the first roadway marking 28 assigned to the driver's side of the motor vehicle 14 and the second roadway marking 30 assigned to the passenger side of the motor vehicle 14 are each assigned to a lane type, based on the sensor data 32 representing the environment of the motor vehicle 14. In a second method step V2, a comparison of the respective determined lane types for the respective roadway markings 26 is carried out. In a first step, it is checked whether the determined lane type assigned to the first roadway marking 28 which was determined as a function of the swarm data 18 matches the lane type determined for the first roadway marking 28 which was determined as a function of the sensor data 32. In the case of right-hand traffic, it is thus checked in the first step whether the traffic lane boundaries determined proceeding from the swarm data 18 and the sensor data 32, including the lane type and the lane assignment, are identical for the left and thus first roadway marking 28.

In a second step of the comparison, the lane type determined as a function of the sensor data 32 and the lane type determined as a function of the swarm data 18, for the second roadway marking 30 assigned to the passenger side of the motor vehicle 14, are compared to one another. In the case of right-hand traffic, it is thus checked in the second step of the method whether the traffic lane boundaries determined as a function of the swarm data 18 and as a function of the sensor data 32, including the lane type and the lane assignment, are identical for the right and thus second roadway marking 30.

If it is determined in the second method step V2 within the scope of the comparison that identity exists both in the first step and in the second step of the method, in a third method step V3 the lane type assigned to the first roadway marking 28 is then established for the motor vehicle 14 as the lane type that is determined as a function of the sensor data 32, and the motor vehicle 14 is laterally controlled based on the sensor data 32. If it is determined both for the first step and for the second step within the scope of the comparison that identity does not exist, in the third method step V3 the motor vehicle 14 is likely controlled laterally based on the sensor data 32, wherein the lane type determined based on the sensor data 32 is established as the lane type of the first roadway marking 28. If it is determined within the scope of the comparison that identity exists in the first step, and no identity exists in the second step, the motor vehicle 14, in the third method step V3, is laterally controlled based on the sensor data 32, wherein the lane type assigned to the first roadway marking 28 is established as the lane type determined as a function of the sensor data 32.

If it is determined within the scope of the comparison that no identity exists in the first step, but identity exists in the second step, a fourth method step V4 follows the comparison, in which the lane type assigned to the first roadway marking 28 is established as the lane type determined as a function of the swarm data 18. The motor vehicle 14 is laterally controlled by means of the control unit in an assisted manner, as a function of the established lane type of the first roadway marking 28. In particular, the motor vehicle 14 is laterally controlled based on the sensor data 32. As an alternative, the motor vehicle 14 can be laterally controlled based on the swarm data 18.

After expiration of predefined path/time limits, the motor vehicle 14, subsequent to the fourth method step V4, can continue to be controlled within the scope of the third method step V3. In the fourth method step V4, the lane type assigned to the first roadway marking 28 can only be established as the lane type that is determined as a function of the swarm data 18 when the swarm data 18 meets at least one predefined quality criterion. Two quality criteria were specified in the present example, wherein a match rate to be met between parameters determined from the swarm data 18 and parameters determined from the sensor data 32 for a defined route section is specified as one of the quality criteria. A localization quality to be adhered to of a localization of the motor vehicle 14 on the road 10 based on the swarm data 18 is specified as a second quality criterion.

In some examples, a time interval can be specified and/or a covered route can be specified and/or a speed range for the motor vehicle 14 can be specified and/or a curvature limit value can be specified and/or a width range for the road 10 can be specified and/or a distance range for a distance between the motor vehicle 14 and the second roadway marking 30 can be specified as the path/time limits. This means that, within the scope of the fourth method step V4, the lane type assigned to the first roadway marking 28 is established as the lane type determined as a function of the swarm data 18, while a predefined time interval is ongoing and/or while the motor vehicle 14 is covering the predefined route and/or while the motor vehicle 14 is being moved in the driving direction at a speed within a predefined speed range and/or when the road 10 has a curvature above a predefined curvature limit value and/or when the road 10 including the roadway markings 26 has a width within a predefined width range and/or when the motor vehicle 14 has a distance with respect to the second roadway marking assigned 30 within the predefined distance range.

In principle, good real-life data of the lane recognition, in the present example the sensor data 32 which is provided by the camera device 22, is generally preferable over potentially outdated map data, and thus the swarm data 18. In a method, the use of the swarm data 18 for overruling the real-life data is thus limited, wherein nonetheless the stated problem is solved.

Figure 3:
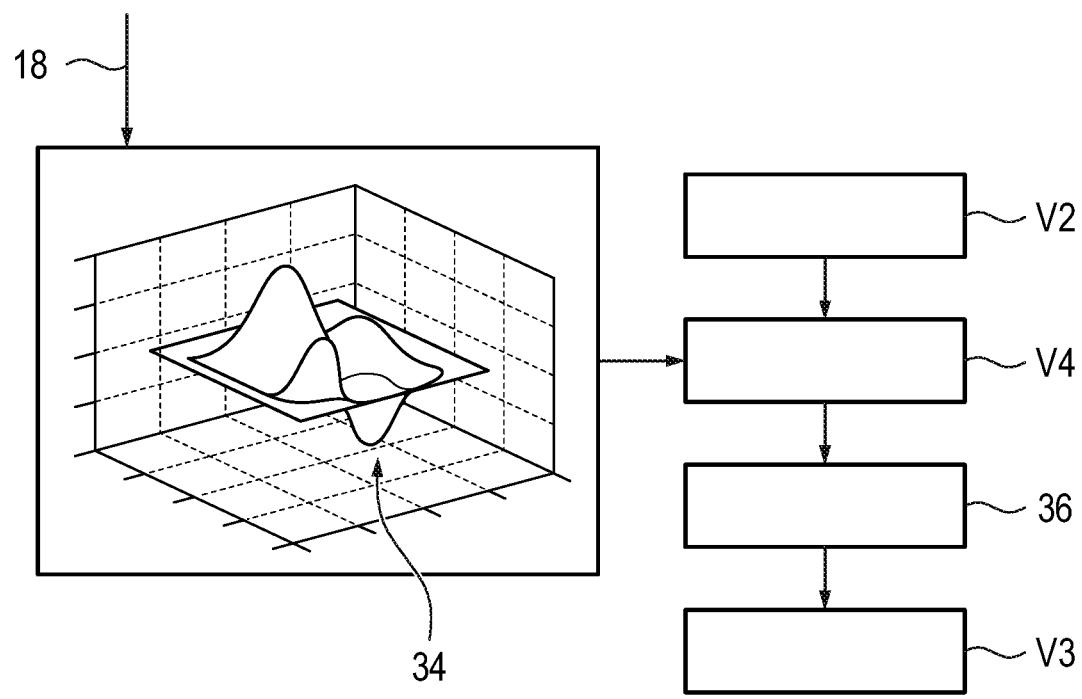
FIG. 3 shows a schematic diagram of a method for laterally controlling the motor vehicle on the road under some aspects of the present disclosure.

FIG. 3 shows a portion of the method from FIG. 2 in greater detail. The figure shows the case in which it was determined, based on the swarm data 18, that the first roadway marking 28 is to be assigned to the neighboring lane, while it was determined, based on the sensor data 32, that the first roadway marking 28 is to be assigned to the ego lane, which was determined within the scope of the comparison in the second method step V2. Thereafter, in the fourth method step V4, the lane type determined based on the sensor data 32 is overruled by the swarm data 18, provided that a degree of confidence of the swarm data 18 is sufficiently high, and the swarm data 18 thus meets the at least one predefined quality criterion. Using a multi-dimensional characteristic map 34, respective application parameters of the overruling of the sensor data 32 by the swarm data 18 can be established for the determination of the lane type. In this way, a maximum route and/or a maximum time and/or a speed range and/or a minimum degree of confidence and/or a curvature range and/or a distance range can be specified as application parameters, wherein it is determined based on the application parameters whether the lane type determined based on the sensor data 32 is overruled by the lane type determined based on the swarm data 18. These application parameters can specify the path/time limits. Up to a situation 36 in which the path/time limits are reached, and in particular exceeded, the motor vehicle 14 is laterally controlled by means of the control unit in an assisted manner, as a function of the lane type of the first roadway marking 28 which is established based on the swarm data 18. The motor vehicle 14 can additionally be laterally controlled by using the second roadway marking 30 as a reference. If the situation 36 occurs in which the path/time limits have been reached, the motor vehicle 14 is thereafter laterally controlled in the third method step V3, in which the motor vehicle 14 is controlled based on the sensor data 32, in particular as a function of the lane type of the first roadway marking 28 which is determined based on the sensor data 32.

Overall, the present disclosure shows how a method for stabilizing a real-life lane detection of a front camera can be implemented using swarm data 18.

LIST OF REFERENCE NUMERALS 10 road
12 lane
14 motor vehicle
16 road user
18 swarm data
20 server device
22 camera device
24 visual range
26 roadway marking
28 first roadway marking
30 second roadway marking
32 sensor data
34 characteristic map
36 situation
V1a to V4 respective method steps

The invention claimed is:

1. A method for laterally controlling a motor vehicle on a road, comprising:
assigning a lane type to a roadway marking on a driver's side of the motor vehicle using sensor data, wherein the lane type characterizes whether the roadway marking is (i) assigned to an ego lane of the motor vehicle, or (ii) assigned to a neighboring lane adjacent to the ego lane;
assigning the lane type to the roadway marking using swarm data;
determining that the assigned lane type using sensor data and the assigned lane type using swarm data diverge;
establishing the lane type to the roadway marking on the driver's side of the motor vehicle as a function of the swarm data, based on the divergence;
laterally controlling the motor vehicle via an electronic computing device in an assisted manner as a function of the established lane type of the roadway marking that is assigned to the driver's side of the motor vehicle.

2. The method according to claim 1, wherein the motor vehicle is laterally controlled based on the sensor data.

3. The method according to claim 1, wherein the motor vehicle is laterally controlled based on the swarm data.

4. The method according to claim 1, wherein the lane type assigned to the roadway marking is established as the lane type that is determined as a function of the sensor data, when a lane type determined based on the sensor data and a lane type determined based on the swarm data for a roadway marking that is assigned to the passenger side of the motor vehicle diverge.

5. The method according to claim 1, wherein the sensor data comprises camera data based on which the roadway marking that is assigned to the driver's side of the motor vehicle is analyzed by way of an image recognition method.

6. The method according to claim 1, wherein the lane type assigned to the roadway marking is established as the lane type that is determined as a function of the swarm data when the swarm data meets at least one predefined quality criterion.

7. The method according to claim 6, wherein:
a match rate between parameters determined from the swarm data and parameters determined from the sensor data for a defined route section is specified as the quality criterion, and/or
a localization quality of a localization of the motor vehicle on the road based on the swarm data is specified as a quality criterion.

8. The method according to claim 1, wherein the lane type assigned to the roadway marking is established as the lane type that is determined as a function of the swarm data under one or more of the following conditions:
while a predefined time interval is ongoing,
while the motor vehicle is covering a predefined route,
while the motor vehicle is being moved in the driving direction at a speed within a predefined speed range,
when the road has a curvature above a predefined curvature limit value,
when the road including the roadway marking has a width within a predefined width range, and/or
when the motor vehicle has a distance with respect to a further roadway marking that is assigned to a passenger side of the motor vehicle within a predefined distance range.

9. The method according to claim 1, wherein the lane type assigned to the roadway marking that is assigned to the driver's side of the motor vehicle is established as the lane type that is determined as a function of the sensor data when the lane type determined based on the sensor data and the lane type determined based on the swarm data are identical.

10. A motor vehicle, configured for lateral control on a road, comprising:
sensors for providing sensor data;
communications for receiving swarm data;
an electronic computing device, operatively coupled to the sensors and communications, the electronic computing device being configured to facilitate lateral control of the motor vehicle; and
a processing apparatus, operatively coupled to the electronic computing device, communications and the sensors, wherein the processing apparatus is configured to assign lane type to a roadway marking on a driver's side of the motor vehicle using sensor data, wherein the lane type characterizes whether the roadway marking is (i) assigned to an ego lane of the motor vehicle, or (ii) assigned to a neighboring lane adjacent to the ego lane;
assign the lane type to the roadway marking using the swarm data;
determine that the assigned lane type using sensor data and the assigned lane type using swarm data diverge;
establish the lane type to the roadway marking on the driver's side of the motor vehicle as a function of the swarm data, based on the divergence; and
laterally control the motor vehicle via the electronic computing device in an assisted manner as a function of the established lane type of the roadway marking that is assigned to the driver's side of the motor vehicle.

11. The motor vehicle of claim 10, wherein the motor vehicle is laterally controlled based on the sensor data.

12. The motor vehicle of claim 10, wherein the motor vehicle is laterally controlled based on the swarm data.

13. The motor vehicle of claim 10, wherein the lane type assigned to the roadway marking is established as the lane type that is determined as a function of the sensor data, when a lane type determined based on the sensor data and a lane type determined based on the swarm data for a roadway marking that is assigned to the passenger side of the motor vehicle diverge.

14. The motor vehicle of claim 10, wherein the sensor data comprises camera data based on which the roadway marking that is assigned to the driver's side of the motor vehicle is analyzed by way of an image recognition method.

15. The motor vehicle of claim 10, wherein the lane type assigned to the roadway marking is established as the lane type that is determined as a function of the swarm data when the swarm data meets at least one predefined quality criterion.

16. The motor vehicle of claim 15, wherein:
a match rate between parameters determined from the swarm data and parameters determined from the sensor data for a defined route section is specified as the quality criterion, and/or
a localization quality of a localization of the motor vehicle on the road based on the swarm data is specified as a quality criterion.

17. The motor vehicle of claim 10, wherein the lane type assigned to the roadway marking is established as the lane type that is determined as a function of the swarm data under one or more of the following conditions:
while a predefined time interval is ongoing,
while the motor vehicle is covering a predefined route,
while the motor vehicle is being moved in the driving direction at a speed within a predefined speed range,
when the road has a curvature above a predefined curvature limit value,
when the road including the roadway marking has a width within a predefined width range, and/or
when the motor vehicle has a distance with respect to a further roadway marking that is assigned to a passenger side of the motor vehicle within a predefined distance range.

18. The motor vehicle according to claim 10, wherein the lane type assigned to the roadway marking that is assigned to the driver's side of the motor vehicle is established as the lane type that is determined as a function of the sensor data when the lane type determined based on the sensor data and the lane type determined based on the swarm data are identical.

19. A method for laterally controlling a motor vehicle on a road, comprising:
assigning a lane type to a roadway marking on a driver's side of the motor vehicle using sensor data, wherein the lane type characterizes whether the roadway marking is (i) assigned to an ego lane of the motor vehicle, or (ii) assigned to a neighboring lane adjacent to the ego lane;
assigning the lane type to the roadway marking using swarm data;
determining that the assigned lane type using sensor data and the assigned lane type using swarm data diverge;
establishing the lane type to the roadway marking on the driver's side of the motor vehicle as a function of the swarm data, based on the divergence;
laterally controlling the motor vehicle via an electronic computing device in an assisted manner as a function of the established lane type of the roadway marking that is assigned to the driver's side of the motor vehicle,
wherein the motor vehicle is laterally controlled based on one of the sensor data or the swarm data.

20. The method according to claim 19, wherein the lane type assigned to the roadway marking is established as the lane type that is determined as a function of the sensor data, when a lane type determined based on the sensor data and a lane type determined based on the swarm data for a roadway marking that is assigned to the passenger side of the motor vehicle diverge.

* * * * *